(12) United States Patent
Motomura et al.

(10) Patent No.: US 11,833,893 B2
(45) Date of Patent: Dec. 5, 2023

(54) GUIDE RAIL AND SUNROOF APPARATUS

(71) Applicant: AISIN CORPORATION, Aichi (JP)

(72) Inventors: Shota Motomura, Kariya (JP); Katsutoshi Kato, Kariya (JP)

(73) Assignee: Aisin Corporation, Kariya (JP)

( * ) Notice: Subject to any disclaimer, the term of this patent is extended or adjusted under 35 U.S.C. 154(b) by 0 days.

(21) Appl. No.: 17/805,530

(22) Filed: Jun. 6, 2022

(65) Prior Publication Data
US 2023/0009910 A1    Jan. 12, 2023

(30) Foreign Application Priority Data
Jul. 9, 2021 (JP) ................................. 2021-114167

(51) Int. Cl.
*B60J 7/043* (2006.01)
(52) U.S. Cl.
CPC .................... *B60J 7/043* (2013.01)
(58) Field of Classification Search
CPC ....................................................... B60J 7/022
USPC .................................................. 296/216.08
See application file for complete search history.

(56) References Cited

U.S. PATENT DOCUMENTS

| 8,256,832 B2 * | 9/2012 | Adamski | ................ | B60J 7/022 |
| | | | | 296/216.08 |
| 2016/0101672 A1 * | 4/2016 | Oshima | ................ | B62D 25/00 |
| | | | | 296/210 |

FOREIGN PATENT DOCUMENTS

JP    2001-138745 A    5/2001

* cited by examiner

*Primary Examiner* — Dennis H Pedder
(74) *Attorney, Agent, or Firm* — Finnegan, Henderson, Farabow, Garrett & Dunner, LLP (57) ABSTRACT

A guide rail for a sunroof apparatus includes an inner member and an outer member. The outer member is arranged on an outer side of the inner member in a width direction in an attached state where the guide rail is attached to a vehicle. The inner member guides a drive shoe of the sunroof apparatus. The outer member includes a fixed portion fixed to the vehicle. The outer member is coupled to the inner member.

7 Claims, 5 Drawing Sheets

GUIDE RAIL AND SUNROOF APPARATUS

CROSS REFERENCE TO RELATED APPLICATIONS

This application is based on and claims priority under 35 U.S.C. § 119 to Japanese Patent Application 2021-114167, filed on Jul. 9, 2021, the entire content of which is incorporated herein by reference.

TECHNICAL FIELD

This disclosure generally relates to a guide rail and a sunroof apparatus.

BACKGROUND DISCUSSION

A sunroof apparatus attached to a vehicle is known. A sunroof apparatus described in JP2001-138745A (Reference 1) includes guide rails, shoes guided by the guide rails, and a movable panel that moves accompanying movement of the shoes.

Incidentally, conventionally, the guide rail is formed by an aluminum extrusion method or an aluminum drawing method. For example, an original component of the guide rail is formed by the aluminum extrusion method or the aluminum drawing method, and is additionally processed at a post-step, and thereby, the guide rail is formed. Thus, the guide rail of the conventional structure is manufactured by performing a plurality of steps in turn. Due to such a manufacturing method, it is difficult to shorten manufacturing time for the conventional guide rail. From a viewpoint of production efficiency, there is room for improvement in the structure of the guide rail.

A need thus exists for a guide rail and a sunroof apparatus which are not susceptible to the drawback mentioned above.

SUMMARY

According to an aspect of this disclosure, a guide rail for a sunroof apparatus includes an inner member and an outer member. The outer member is arranged on an outer side of the inner member in a width direction in an attached state where the guide rail is attached to a vehicle. The inner member guides a drive shoe of the sunroof apparatus. The outer member includes a fixed portion fixed to the vehicle. The outer member is coupled to the inner member.

According to another aspect of this disclosure, a sunroof apparatus includes a guide rail including an inner member and an outer member. The outer member is arranged on an outer side of the inner member in a width direction in an attached state where the guide rail is attached to a vehicle. The inner member guides a drive shoe of the sunroof apparatus. The outer member includes a fixed portion fixed to the vehicle. The outer member is coupled to the inner member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A sunroof apparatus 10 and a guide rail 11 are described with reference to FIG. 1 to FIG. 6. In this embodiment, a width direction DX indicates a direction along a vehicle width direction in a state where the sunroof apparatus 10 is provided in a vehicle 1. A front-rear direction DY indicates a direction along a front-rear direction of the vehicle 1 in the state where the sunroof apparatus 10 is provided in the vehicle 1. An up-down direction DZ indicates a direction along an up-down direction of the vehicle 1 in the state where the sunroof apparatus 10 is provided in the vehicle 1.

Figure 1:
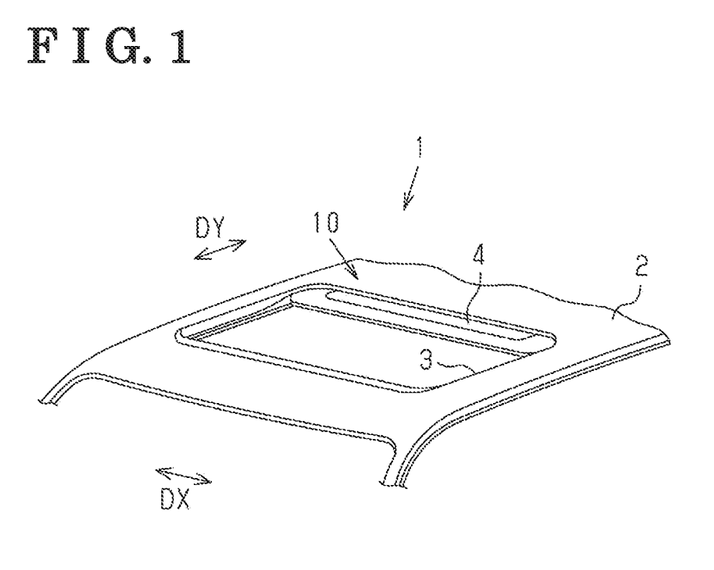
FIG. 1 is a schematic view of a vehicle including a sunroof apparatus.
Figure 2:
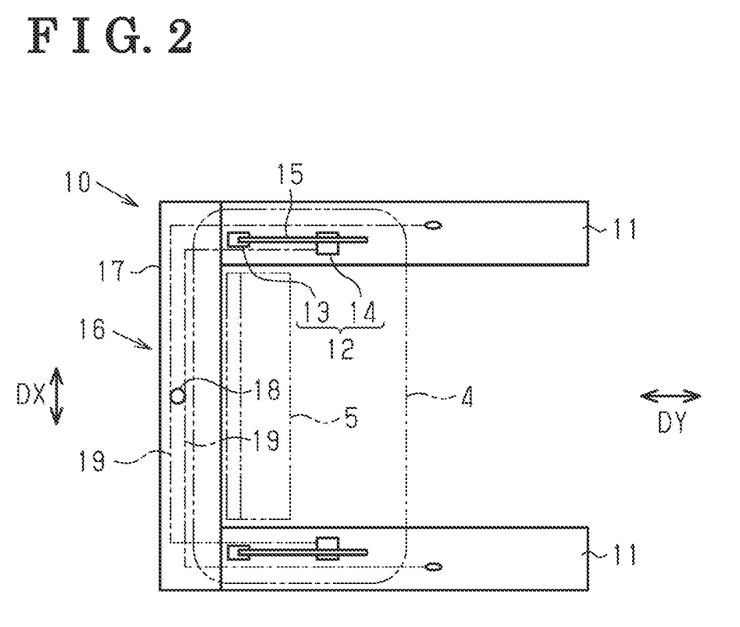
FIG. 2 is a schematic view of the sunroof apparatus.

As illustrated in FIG. 1 and FIG. 2, the sunroof apparatus 10 is provided at a roof 2 of the vehicle 1. As illustrated in FIG. 2, the sunroof apparatus 10 includes a movable panel 4, a sunshade 5, the guide rail 11, a drive shoe 12, a support bracket 15, and an actuator 16. In FIG. 2, some of a plurality of the constituent elements are drawn with the one-dot chain lines or the two-dot chain lines in such a way that the constituent elements of the sunroof apparatus 10 can be easily recognized.

The movable panel 4 opens and closes an opening 3 provided in the roof 2. The two guide rails 11 are arranged to each other in the width direction DX. The two guide rails 11 are configured in such a way as to extend in the front-rear direction DY.

The drive shoe 12 includes a front shoe 13 and a rear shoe 14. The front shoe 13 and the rear shoe 14 are guided by the guide rail 11. The rear shoe 14 is arranged on a rear side of the front shoe 13. The front shoe 13 is linked to a front portion of the support bracket 15. The rear shoe 14 is movable back and forth relative to the support bracket 15. The rear shoe 14 engages with the support bracket 15, thereby moving the support bracket 15.

The support bracket 15 supports the movable panel 4. The support brackets 15 are fixed to both end portions of the movable panel 4 in the width direction DX. The movable panel 4 is supported by the two support brackets 15. The support brackets 15 extend in the front-rear direction DY.

The actuator 16 is provided in a front housing 17, for example. The front housing 17 is configured in such a way as to connect front portions of the two guide rails 11 to each other. The front housing 17 is made of resin. The actuator 16 moves the support brackets 15, thereby moving the movable panel 4.

In one example, the actuator 16 includes a motor 18 and two cables 19. The cables 19 are moved by power of the motor 18. The motor 18 moves the two cables 19 simultaneously in directions opposite to each other. The two cables 19 are linked to the two respective rear shoes 14. Movement of the cables 19 moves the support brackets 15 via the rear shoes 14, accordingly moving the movable panel 4.

The sunshade 5 is provided unfoldably between the two guide rails 11. The sunshade 5 includes a sheet 20 and sunshade shoes 21 provided at both ends of the sheet 20 (refer to FIG. 4). The sunshade shoes 21 are guided by the guide rails 11.

A structure of the guide rail 11 is described with reference to FIG. 3 to FIG. 6.

Figure 3:
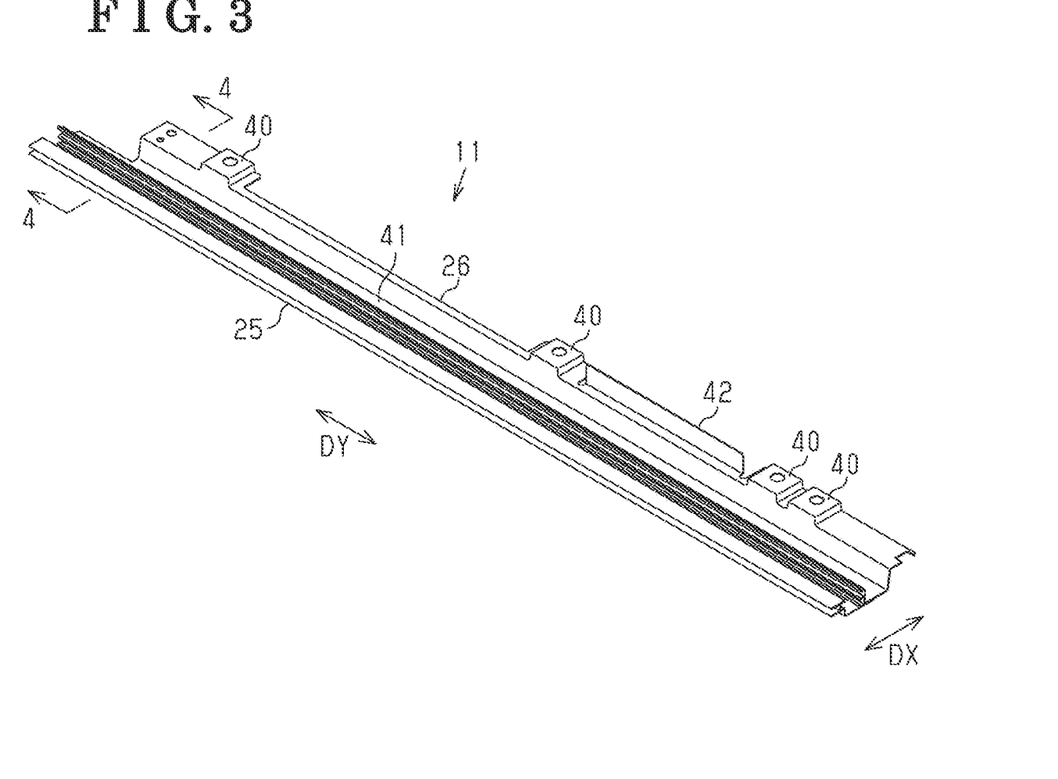
FIG. 3 is a perspective view of a guide rail.

As illustrated in FIG. 3, the guide rail 11 includes an inner member 25 and an outer member 26. The outer member 26 is coupled to the inner member 25. In one example, the outer member 26 is coupled to the inner member 25 by projection welding. Means for the coupling is not limited to this. The outer member 26 may be coupled to the inner member 25 by brazing or fastening.

The inner member 25 is constituted of an iron plate. The inner member 25 extends in the front-rear direction DY. The inner member 25 guides the drive shoe 12 of the sunroof apparatus 10. Further, the inner member 25 guides the sunshade shoe 21.

Figure 4:
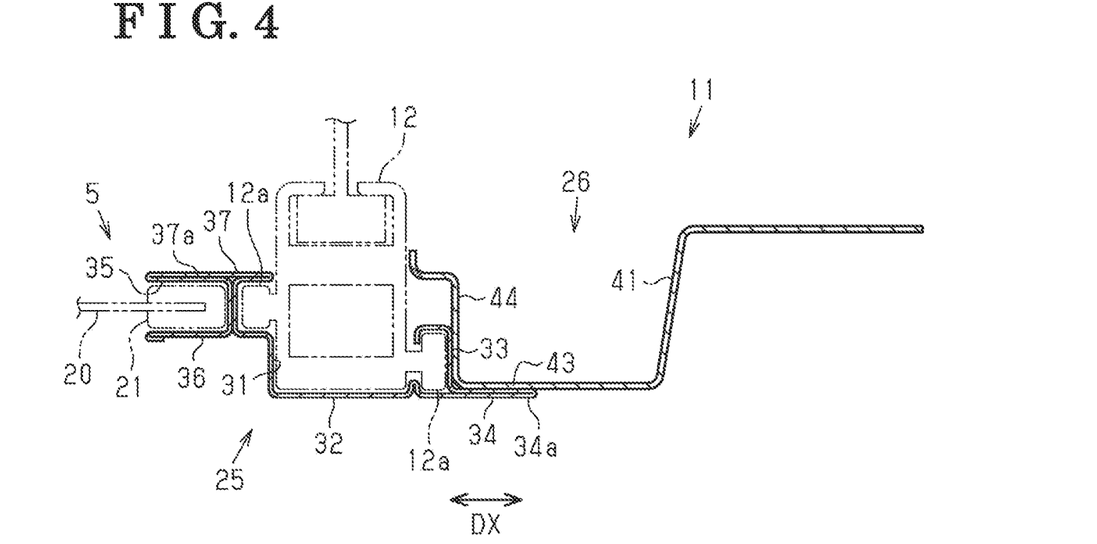
FIG. 4 is a cross-sectional view of the guide rail taken along the line 4-4 in FIG. 3.

As illustrated in FIG. 4, the inner member 25 includes a first groove portion 31 guiding the drive shoe 12. The first groove portion 31 extends in the front-rear direction DY. The first groove portion 31 includes a first bottom wall 32, a vertical wall 33, and a protrusion portion 34 that protrudes outward from the vertical wall 33. The vertical wall 33 is located at an outer end of the first bottom wall 32 in the width direction DX.

Figure 5:
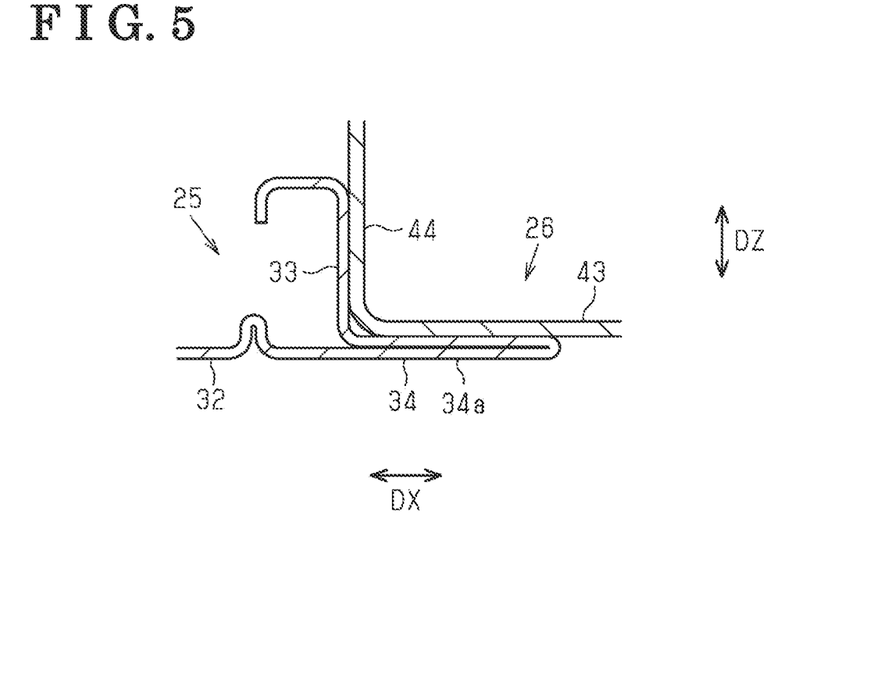
FIG. 5 is an enlarged cross-sectional view of a protrusion portion.

As illustrated in FIG. 5, the protrusion portion 34 is constituted of a folded portion 34a extending from the first bottom wall 32 and connected to the vertical wall 33. The folded portion 34a has a structure in which a part extending from the first bottom wall 32 is folded in such a way as to overlap with itself.

The inner member 25 further includes a second groove portion 35. The second groove portion 35 is configured in such a way that a component of a different apparatus other than the sunroof apparatus 10 can be attached to the second groove portion 35. In this embodiment, the second groove portion 35 is configured in such a way as to guide the sunshade shoe 21. The second groove portion 35 extends in the front-rear direction DY. The second groove portion 35 is located on an inner side of the first groove portion 31 in the width direction DX. The second groove portion 35 includes a second bottom wall 36. The first groove portion 31 and the second groove portion 35 are partitioned from each other by a partition wall 37.

Figure 6:
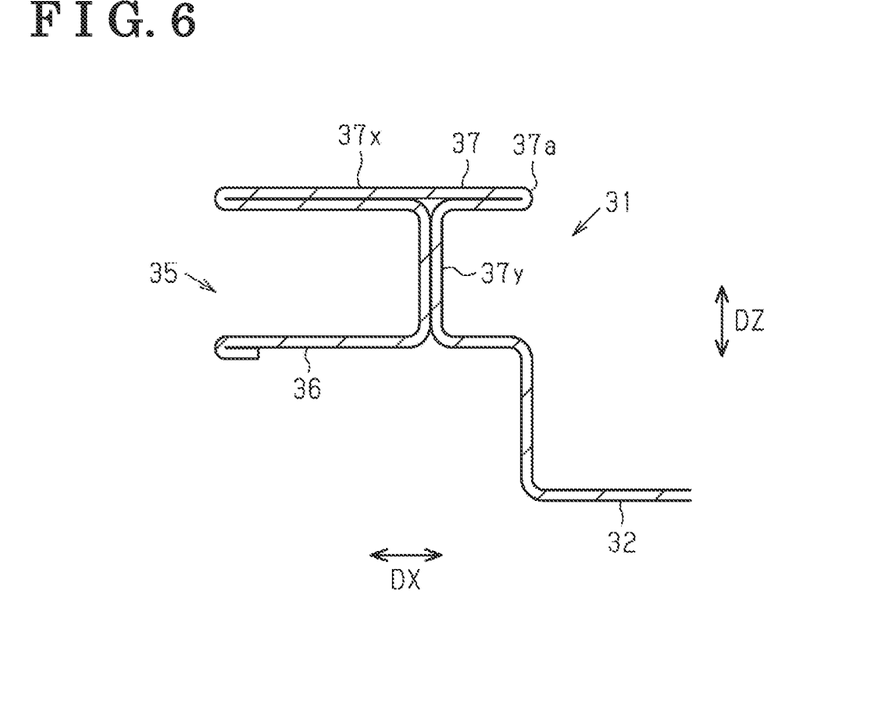
FIG. 6 is an enlarged cross-sectional view of a partition wall.

As illustrated in FIG. 6, the partition wall 37 is constituted of a folded portion 37a extending from the first bottom wall 32 and joined to the second bottom wall 36. The partition wall 37 includes a vertical wall 37y extending in the up-down direction DZ, and an upper wall 37x provided at an upper end of the vertical wall 37y and extending in the width direction DX. A part that is included in the upper wall 37x and that is on an inner side of the vertical wall 37y constitutes an upper wall of the second groove portion 35. A part that is included in the upper wall 37x and that is on an outer side of the vertical wall 37y constitutes an upper wall of a path through which a sliding contact portion 12a of the drive shoe 12 passes.

The inner member 25 is formed by roll forming. The inner member 25 may be provided with a hole or a notch for being coupled to another component. The hole and the notch are formed by press working. In one example, the roll forming and the press working are performed continuously by a progressive die.

The outer member 26 is constituted of an iron plate. The outer member 26 extends in the front-rear direction DY. The outer member 26 is arranged on an outer side of the inner member 25 in the width direction DX in an attached state where the guide rail 11 is attached to the vehicle 1.

As illustrated in FIG. 3, the outer member 26 includes fixed portions 40 fixed to the vehicle 1. The outer member 26 includes a drain portion 41. The drain portion 41 is a drainage path for rainwater. The drain portion 41 is located on an inner side of the fixed portions 40. The drain portion 41 extends in the front-rear direction DY. The outer member 26 may include a side cover 42. The side cover 42 is provided in such a way as to prevent a component provided on an outer side of the side cover 42 from being seen through a gap between the guide rail 11 and the roof 2.

As illustrated in FIG. 4, the outer member 26 is positioned relative to the inner member 25. In one example, the outer member 26 is arranged in such a way as to contact with the protrusion portion 34 and the vertical wall 33 of the inner member 25. For example, the outer member 26 includes a bottom wall 43 contacting with the protrusion portion 34 of the inner member 25, and a vertical wall 44 contacting with the vertical wall 33 of the inner member 25. The vertical wall 44 is provided at the innermost end in the bottom wall 43. Thereby, the outer member 26 is positioned relative to the inner member 25 in the width direction DX and in the up-down direction DZ.

The outer member 26 is formed by press forming. The fixed portions 40, the drain portion 41, and the side cover 42 are formed at a step of the press forming. The outer member 26 may be provided with a hole or a notch for being coupled to another component. In one example, the press forming is performed continuously by a progressive die.

An effect of this embodiment is described.

The guide rail 11 includes a part guiding the drive shoe 12 and a part fixed to the vehicle 1. In the part guiding the drive shoe 12, a cross section intersecting with a longitudinal direction of the guide rail 11 is the same over the front-rear direction DY. In the part (including a fixed portion 40, for example) fixed to the vehicle 1, a cross section intersecting with the longitudinal direction of the guide rail 11 varies in the front-rear direction DY. Accordingly, when the guide rail 11 is formed by an extrusion method or a drawing method, an original component of the guide rail 11 is formed by the extrusion method or the drawing method, and the fixed portion 40 is then formed at a next step. Thus, conventionally, a manufacturing step for the guide rail 11 is divided into the pre-step and the post-step. In contrast to this, the guide rail 11 of the above-described configuration is configured in such a way that the inner member 25 guiding the drive shoe 12 and the outer member 26 including the fixed portions 40 are bodies separate from each other. Thus, the inner member 25 and the outer member 26 can be manufactured in parallel. Accordingly, production efficiency of the guide rail 11 can be improved.

Advantageous effects of this embodiment are described.

(1) The guide rail 11 includes the inner member 25 and the outer member 26. The outer member 26 is coupled to the inner member 25. According to this configuration, the inner member 25 and the outer member 26 can be manufactured in parallel. Accordingly, production efficiency of the guide rail 11 can be improved.

(2) The inner member 25 is constituted of an iron plate. The outer member 26 is constituted of an iron plate. According to this configuration, raw material cost can be reduced as compared to the guide rail 11 made of aluminum, since the inner member 25 and the outer member 26 are constituted of the iron plates.

(3) The inner member 25 includes the first bottom wall 32, the vertical wall 33, and the protrusion portion 34 protruding outward from the vertical wall 33. The outer member 26 is arranged in such a way as to contact with the protrusion portion 34 and the vertical wall 33 of the inner member 25. According to this configuration, the outer member 26 can be positioned relative to the inner member 25 in the up-down direction DZ and in the width direction DX.

(4) The protrusion portion 34 is constituted of the folded portion 34a extending from the first bottom wall 32 and joined to the vertical wall 33. According to this configuration, the inner member 25 including the protrusion portion 34 can be formed by a roll forming machine.

(5) The inner member 25 includes the first groove portion 31 guiding the drive shoe 12, and the second groove portion 35 to which the component of the different apparatus other than the sunroof apparatus 10 is attached. The first groove portion 31 and the second groove portion 35 are partitioned from each other by the partition wall 37. The partition wall 37 is constituted of the folded portion 37a extending from the first bottom wall 32 and joined to the second bottom wall 36. According to this configuration, the inner member 25 including the partition wall 37 can be formed by a roll forming machine.

(6) One example of the different apparatus is the sunshade 5. One example of the component of the different apparatus is the sunshade shoe 21. According to this configuration, the sunshade shoe 21 can be guided by the second groove portion 35.

(7) The sunroof apparatus 10 includes the guide rail 11 of any one of the above-described configurations. According to this configuration, production efficiency of the guide rail 11 can be improved. Thereby, production efficiency of the sunroof apparatus 10 can be improved.

Additional Embodiment

The above-described embodiment can be modified and implemented as follows. The above-described embodiment and the following additional embodiment can be implemented in combination with each other within a range where technical contradiction does not occur.

Figure 7:
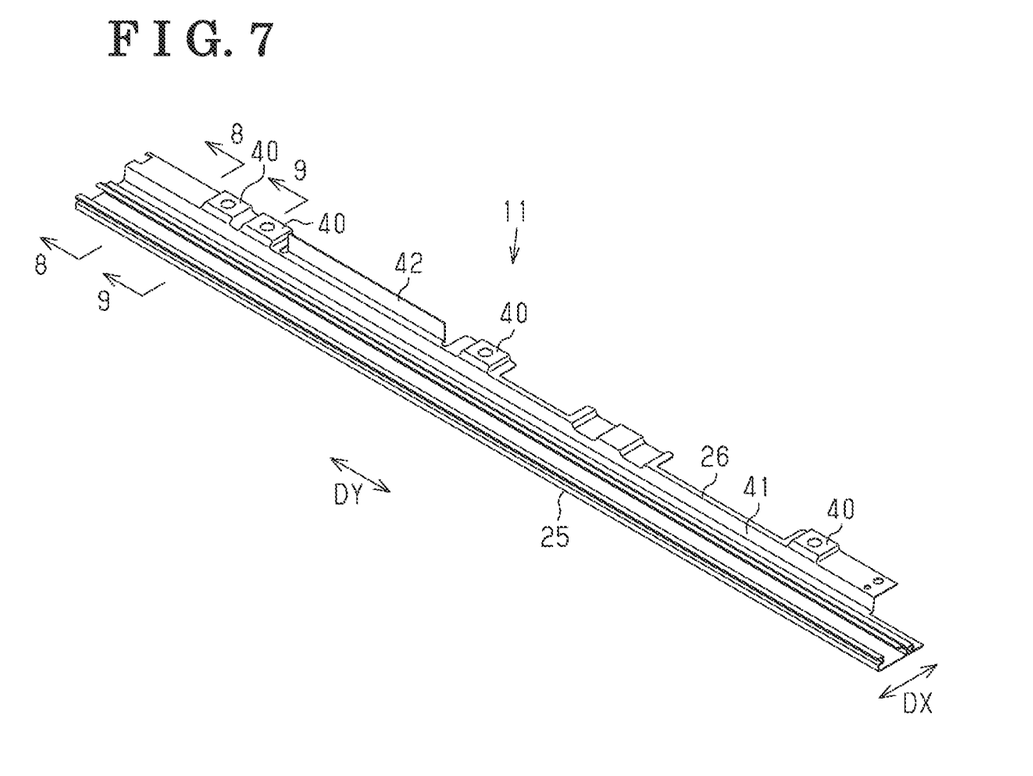
FIG. 7 is a perspective view of a guide rail according to an additional embodiment.

A guide rail 11 according to the additional embodiment is described with reference to FIG. 7 to FIG. 9. In this embodiment, a structure of the inner member 25 is different from that in the above-described embodiment. The inner member 25 includes a first groove portion 31 guiding the drive shoe 12, and a second groove portion 35 guiding the sunshade shoe 21.

Figure 8:
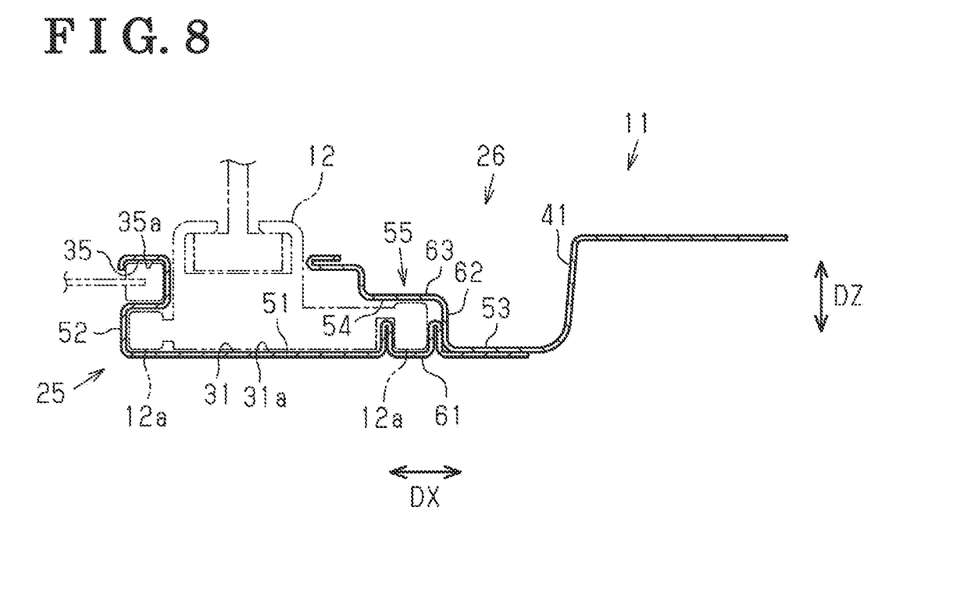
FIG. 8 is a cross-sectional view of the guide rail taken along the line 8-8 in FIG. 7.
Figure 9:
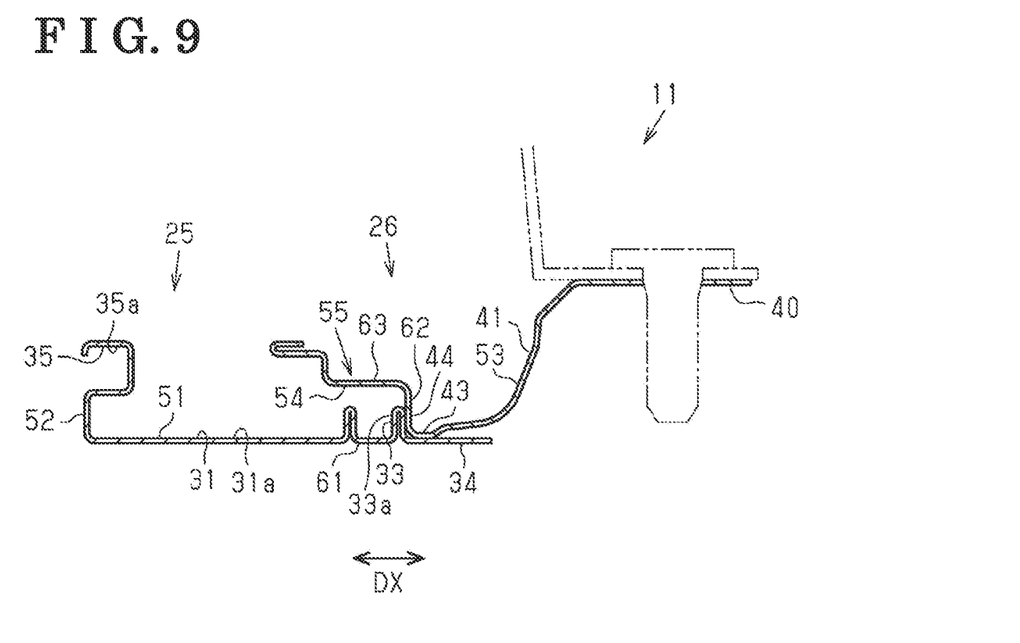
FIG. 9 is a cross-sectional view of the guide rail taken along the line 9-9 in FIG. 7.

As illustrated in FIG. 8 and FIG. 9, at least a part of a groove inner surface 31a of the first groove portion 31 is constituted of a first main surface 51 of the inner member 25. At least a part of a groove inner surface 35a of the second groove portion 35 is constituted of a second main surface 52. The second main surface 52 is a surface included in the inner member 25 and opposite to the first main surface 51. The first main surface 51 of an original member of the inner member 25 is thrust by a roller, and thereby, the first groove portion 31 is formed. The second main surface 52 of the original member of the inner member 25 is thrust by a roller, and thereby, the second groove portion 35 is formed. Thus, the inner member 25 including the first groove portion 31 and the second groove portion 35 can be formed by a roll forming machine.

As illustrated in FIG. 8 and FIG. 9, at least a part of the groove inner surface 31a of the first groove portion 31 may be constituted of the first main surface 51 of the inner member 25 and a second main surface 54 of the outer member 26. The second main surface 54 of the outer member 26 is a surface opposite to a first main surface 53 of the outer member 26. The first main surface 53 of the outer member 26 is a surface facing upward.

In this embodiment, the first groove portion 31 includes a sliding-contact guiding portion 55 including an inner surface on which the sliding contact portion 12a of the drive shoe 12 is arranged and that is constituted of the first main surface 51 of the inner member 25 and the second main surface 54 of the outer member 26. The sliding-contact guiding portion 55 includes a bottom wall 61 formed by the inner member 25. The sliding-contact guiding portion 55 includes a vertical wall 62 and an upper wall 63 that are formed by an inner end portion of the outer member 26. Specifically, the inner end portion of the outer member 26 is bent and arranged above the bottom wall 61 of the sliding-contact guiding portion 55. According to this configuration, the inner member 25 has the simple structure, and thus, the inner member 25 is easily formed.

In this embodiment, the outer member 26 is positioned relative to the inner member 25, similarly to the above-described embodiment. The outer member 26 is arranged in such a way as to contact with a protrusion portion 34 and a vertical wall 33 of the inner member 25. For example, the outer member 26 includes a bottom wall 43 contacting with the protrusion portion 34 of the inner member 25, and a vertical wall 44 contacting with the vertical wall 33 of the inner member 25. The protrusion portion 34 of the inner member 25 does not have a folded structure. The vertical wall 33 of the inner member 25 is constituted of a folded portion 33a.

The component attached to the second groove portion 35 is the sunshade shoe 21 cited as an example in the above-described embodiment and the additional embodiment, but may be another component. The component attached to the second groove portion 35 may be any component that can be attached to the roof 2 of the vehicle 1.

Positioning of the outer member 26 relative to the inner member 25 is not limited to the examples in the embodiments. For example, the inner member 25 may be positioned relative to the outer member 26 in such a way that the inner member 25 contacts with a protrusion portion provided in the outer member 26. Alternatively, the outer member 26 may be positioned relative to the inner member 25 by providing a pin in one of the inner member 25 and the outer member 26, and providing, in the other, a hole through which the pin passes. Alternatively, the outer member 26 may be positioned relative to the inner member 25 by providing, in both of the inner member 25 and the outer member 26, holes through which a pin passes, and inserting the pin into the holes.

A guide rail that solves the above-described problem is a guide rail for a sunroof apparatus that includes an inner member and an outer member. The outer member is arranged on an outer side of the inner member in a width direction in an attached state where the guide rail is attached to a vehicle. The inner member guides a drive shoe of the sunroof apparatus. The outer member includes a fixed portion fixed to the vehicle. The outer member is coupled to the inner member.

A guide rail includes a part guiding the drive shoe and a part fixed to a vehicle. In the part guiding the drive shoe, a cross section intersecting with a longitudinal direction of the guide rail is the same over a front-rear direction. In the part fixed to the vehicle, across section intersecting with the longitudinal direction of the guide rail varies in the front-rear direction. Accordingly, when the guide rail is formed by an extrusion method or a drawing method, an original component of the guide rail is formed by the extrusion method or the drawing method, and a fixed portion is then formed at a next step. Thus, conventionally, a manufacturing step for the guide rail is divided into the pre-step and the post-step. In contrast to this, the guide rail of the above-described configuration is configured in such a way that the inner member guiding the drive shoe and the outer member including the fixed portion are bodies separate from each other. Thus, the inner member and the outer member can be manufactured in parallel. Accordingly, production efficiency of the guide rail can be improved.

In the guide rail of the above-described configuration, the inner member may be constituted of an iron plate, and the outer member may be constituted of an iron plate. According to this configuration, raw material cost can be reduced as compared to a guide rail made of aluminum, since the inner member and the outer member are constituted of the iron plates.

In the guide rail of the above-described configuration, the inner member may include a bottom wall, a vertical wall, and a protrusion portion. The vertical wall may be located at an outer end of the bottom wall in a width direction. The protrusion portion may protrude outward from the vertical wall. The outer member may be arranged in such a way as to contact with the protrusion portion and the vertical wall of the inner member. According to this configuration, the outer member can be positioned relative to the inner member in an up-down direction and in the width direction.

In the guide rail of the above-described configuration, the protrusion portion may be constituted of a folded portion extending from the bottom wall and being joined to the vertical wall. According to this configuration, the inner member including the protrusion portion can be formed by a roll forming machine.

In the guide rail of the above-described configuration, the inner member may include a first groove portion and a second groove portion. The first groove portion may guide the drive shoe. A component of a different apparatus other than the sunroof apparatus may be attached to the second groove portion. The first groove portion and the second groove portion may be partitioned from each other by a partition wall. The first groove portion may include, as the bottom wall, a first bottom wall. The second groove portion may include a second bottom wall. The partition wall may be constituted of a folded portion extending from the first bottom wall and being joined to the second bottom wall. According to this configuration, the inner member including the first groove portion, the second groove portion, and the partition wall can be formed by a roll forming machine.

In the guide rail of the above-described configuration, the inner member may include a first groove portion and a second groove portion. The first groove portion may guide the drive shoe. A component of a different apparatus other than the sunroof apparatus may be attached to the second groove portion. At least a part of a groove inner surface of the first groove portion may be constituted of a first main surface of the inner member. At least a part of a groove inner surface of the second groove portion may be constituted of a second main surface of the inner member opposite to the first main surface. According to this configuration, the inner member including the first groove portion and the second groove portion can be formed by a roll forming machine.

In the guide rail of the above-described configuration, at least a part of the groove inner surface of the first groove portion may be constituted of the first main surface of the inner member and a second main surface of the outer member. According to this configuration, the inner member has a simple structure, and thus, the inner member is easily formed.

In the guide rail of the above-described configuration, the component of the different apparatus may be a sunshade shoe of a sunshade. According to this configuration, the sunshade shoe can be guided by the second groove portion.

A sunroof apparatus that solves the above-described problem includes the guide rail of any one of the above-described configurations. According to this configuration, production efficiency of the sunroof apparatus can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A guide rail for a sunroof apparatus, comprising:
   an inner member; and
   an outer member arranged on an outer side of the inner member in a width direction in an attached state where the guide rail is attached to a vehicle, wherein
   the inner member guides a drive shoe of the sunroof apparatus,
   the outer member includes a fixed portion fixed to the vehicle,
   the outer member is coupled to the inner member;
   the inner member includes: a bottom wall; a vertical wall located at an outer end of the bottom wall in a width direction; and a protrusion portion protruding outward from the vertical wall, and
   the outer member is arranged in such a way as to contact with the protrusion portion and the vertical wall of the inner member.

2. The guide rail according to claim 1, wherein
   the inner member is constituted of an iron plate, and
   the outer member is constituted of an iron plate.

3. The guide rail according to claim 1, wherein
   the protrusion portion is constituted of a folded portion extending from the bottom wall and being joined to the vertical wall.

4. The guide rail according to claim 1, wherein
   the inner member includes: a first groove portion guiding the drive shoe; and a second groove portion to which a component of a different apparatus other than the sunroof apparatus is attached,
   the first groove portion and the second groove portion are partitioned from each other by a partition wall,
   the first groove portion includes, as the bottom wall, a first bottom wall,
   the second groove portion includes a second bottom wall, and
   the partition wall is constituted of a folded portion extending from the first bottom wall and being joined to the second bottom wall.

5. The guide rail according to claim 1, wherein
   the inner member includes: a first groove portion guiding the drive shoe; and a second groove portion to which a component of a different apparatus other than the sunroof apparatus is attached, at least a part of a groove inner surface of the first groove portion is constituted of a first main surface of the inner member, and at least a part of a groove inner surface of the second groove portion is constituted of a second main surface of the inner member being opposite to the first main surface.

6. A guide rail according to claim 5, for a sunroof apparatus, comprising:

an inner member; and an outer member arranged on an outer side of the inner member in a width direction in an attached state where the guide rail is attached to a vehicle, wherein the inner member guides a drive shoe of the sunroof apparatus, the outer member includes a fixed portion fixed to the vehicle, the outer member is coupled to the inner member, the inner member includes: a first groove portion guiding the drive shoe; and a second groove portion to which a component of a different apparatus other than the sunroof apparatus is attached, at least a part of a groove inner surface of the first groove portion is constituted of a first main surface of the inner member, at least a part of a groove inner surface of the second groove portion is constituted of a second main surface of the inner member being opposite to the first main surface, and at least a part of the groove inner surface of the first groove portion is constituted of the first main surface of the inner member and a second main surface of the outer member.

7. The guide rail according to claim 4, wherein the component of the different apparatus is a sunshade shoe of a sunshade.

* * * * *